United States Patent [19]

Kondo et al.

[11] Patent Number: 4,473,050
[45] Date of Patent: Sep. 25, 1984

[54] CAPACITOR CHARGE AND DISCHARGE TYPE IGNITION DEVICE

[75] Inventors: Eiji Kondo, Iruma; Yoshio Morita, Hidaka; Nobuo Miura, Wako; Yukio Miyamaru, Tokyo, all of Japan

[73] Assignees: Shindengen Kogyo Kabushiki Kaisha, Tokyo, Japan; Honda Giken Kogyo Kabushiki Kaisha, Tokyo, Japan

[21] Appl. No.: 306,782

[22] Filed: Sep. 29, 1981

[30] Foreign Application Priority Data

Oct. 6, 1980 [JP] Japan .................................. 55-139500

[51] Int. Cl.³ .............................................. F02P 5/08
[52] U.S. Cl. .................................... 123/427; 123/418; 123/602
[58] Field of Search ............... 123/418, 427, 415, 602, 123/618

[56] References Cited

U.S. PATENT DOCUMENTS

| 3,995,608 | 12/1976 | Suda | 123/427 |
| 4,153,850 | 5/1979 | Boyer | 123/618 |
| 4,252,095 | 2/1981 | Jaulmes | 123/418 |
| 4,284,046 | 8/1981 | Hashimoto et al. | 123/418 |
| 4,292,943 | 10/1981 | Kyogoku et al. | 123/418 |

*Primary Examiner*—Andrew M. Dolinar
*Attorney, Agent, or Firm*—Robert E. Burns; Emmanuel J. Lobato; Bruce L. Adams

[57] ABSTRACT

An inexpensive or economical ignition device which is capable of advancing the ignition timing in proportion to an increase in the engine speed when it stays within a preset range and obtaining constant minimum and maximum ignition angle characteristics when the engine speed is below and above the preset range, respectively, so that the ignition device may be operate in conformity with the output characteristic of an engine. A driving power source for the controller of the ignition device can be provided independently of the pulser coil, thereby to greatly stabilize the ignition characteristic in the low engine speed region.

12 Claims, 5 Drawing Figures

CAPACITOR CHARGE AND DISCHARGE TYPE IGNITION DEVICE

BACKGROUND OF THE INVENTION

The present invention relates to a capacitor charge and discharge type ignition device.

BRIEF SUMMARY OF THE INVENTION

An object of this invention is to provide an inexpensive or economical ignition device which is capable of advancing the ignition timing (angle) in proportion to an increase in the engine speed when it stays within a preset range and obtaining constant minimum and maximum ignition angle characteristics when the engine speed is below and above the preset range, respectively, so that the ignition device may operate in conformity with the output characteristic of an engine.

Another object of this invention is to provide a capacitor, charge and discharge type ignition device in which a driving power source for the controller is provided independently of the pulser coil, thereby to greatly stabilize the ignition characteristic in the low engine speed region.

BRIEF DESCRIPTION OF THE DRAWINGS

The invention will be described in details below with reference to the accompanying drawings, in which.

DETAILED DESCRIPTION

Figure 1:
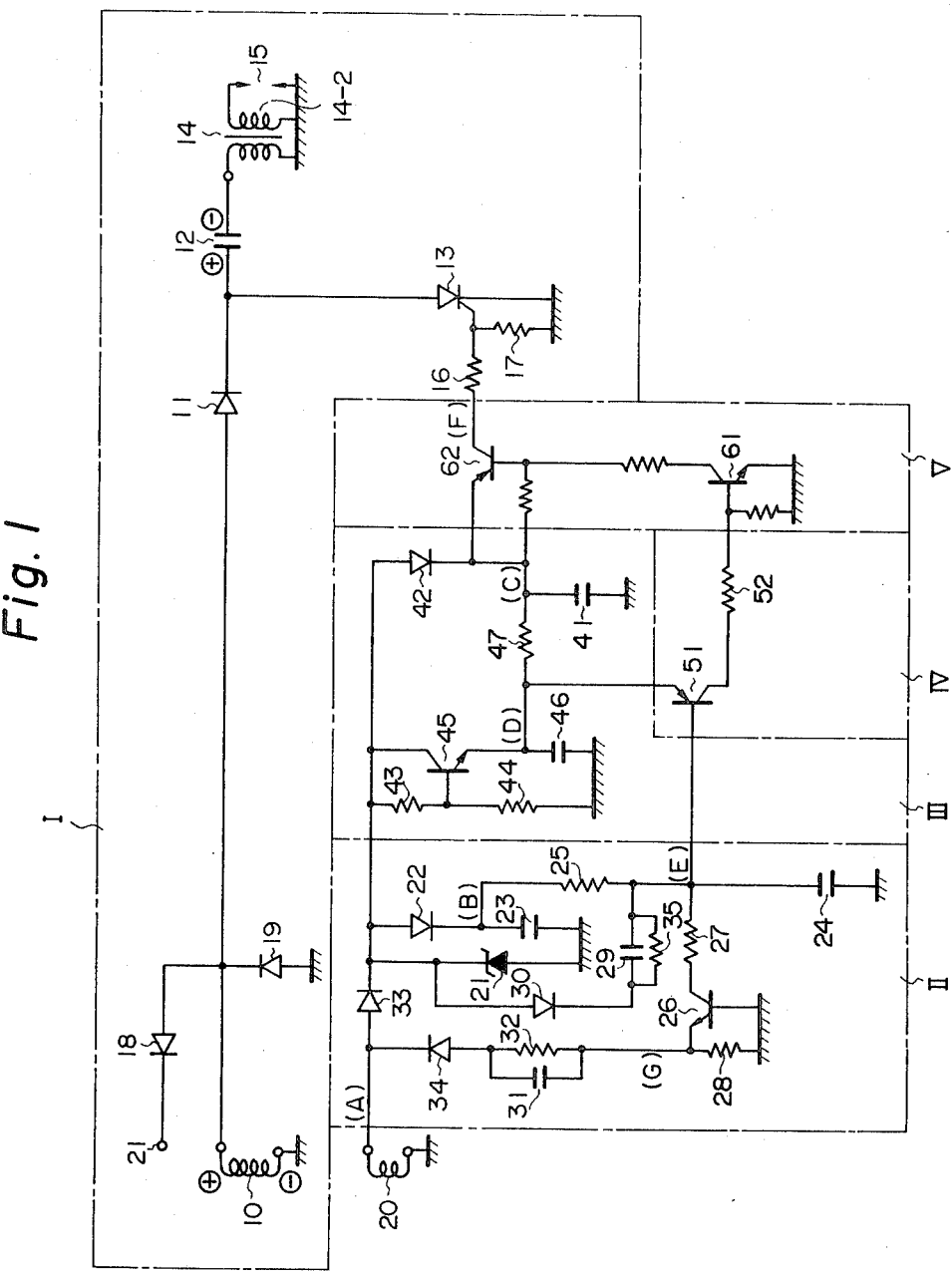
FIGS. 1 and 5 are circuit diagrams each illustrating an embodiment of this invention.

In FIG. 1 showing an embodiment of this invention, reference numeral 10 indicates a generating coil of a magnet type generator or the like which is driven by an engine; 11 designates a rectifying diode; 12 identifies a capacitor serving as an ignition power source, which is charged via the diode 11 by a voltage generated from the generating coil 10; and 13 denotes a thyristor which conducts via a gate circuit described later and by which charges stored in the capacitor 12 are discharged to an ignition coil 14 to produce, via its secondary winding 14-2, sparking at an ignition plug 15. A diode 18 is employed for blocking a reverse current from an external terminal 21, and a diode 19 is used for short-circuiting the output voltage of the generating coil 10 when the polarity is reversed from the illustrated state. These elements constitute a main circuit I.

Reference numeral 20 represents an ignition signal generating coil (hereinafter referred to as a pulser coil) for producing for each revolution of the engine a first timing pulse and a second timing pulse at respective preset ignition angles; II shows a sawtooth wave generator for generating a sawtooth wave voltage the peak value of which varies in proportion to the engine speed; III refers to an impulse wave generator for generating, for each revolution of the engine, an impulse wave of a knife-shaped waveform which has a substantially constant angle of inclination and a nearly fixed peak value and the front edge and the rear edge of which are respectively synchronized with the corresponding one of the first timing pulses and the corresponding one of the second timing pulses, IV indicates a comparator for comparing the sawtooth wave (voltage) with the impulse wave (voltage) to produce an output when the peak value of the impulse wave exceeds the peak value of the saw-tooth wave; and V designates a gate circuit for turning ON a gate of the thyristor 13 by the output from the comparator IV. A detailed description will be given of the circuits II to V.

Reference numeral 21 identifies a constant voltage element for clamping a signal voltage first timing pulse of the pulser coil 20; 22 and 23 respectively denote a diode and a capacitor connected across the pulser coil 20, the capacitor 23 being charged by the abovesaid first timing pulse up to the aforementioned clamp voltage; 24 represents a capacitor which is charged by the charging voltage of the capacitor 23 with a required time constant which is determined by this capacitor 24 and a resistor 25; 26 shows a transistor connected to the capacitor 24 via resistors 27 and 28, which transistor is turned ON by the second timing pulse from the pulser coil 20 synchronized with the rotation of the engine, constituting a discharge circuit of the capacitor 24; 29 refers to a capacitor which is charged by the first timing pulse via a diode 30 and which is connected in series to the capacitor 24 to rapidly raise its charging voltage at the start of the engine as will be described later; 31 and 32 indicate a capacitor and a resistor for absorbing noise of the first timing pulses and the second timing pulses; and 33 and 34 designate rectifying diodes. These elements form the circuit II.

Reference numeral 41 identifies a capacitor which is charged by the first timing pulse from the pulser coil 20 via a diode 42; 43 and 44 denote voltage dividing resistors for dividing the voltage of the first timing pulse; and 45 represents a transistor the base of which is connected to the voltage dividing point of the voltage dividing resistors 43 and 44 and turned ON by the first timing pulse from the pulser coil 20 to charge a capacitor 46 up to the divided voltage of the voltage divider so as to form the front edge of the knife-shaped waveform. The capacitors 46 and 41 are connected to each other via a resistor 47. The capacitor 46 is charged by the terminal voltage of the capacitor 41 to provide a substantially constant inclination angle of the knife-shaped waveform with a time constant which is determined by this capacitor 46 and the resistor 47. These elements constitute the circuit III.

Reference numeral 51 shows a transistor which forms the comparator IV and which has an emitter connected to an impulse wave output (point (D)) of the circuit III, a base connected to a sawtooth wave output (point (E)) of the circuit II and a collector connected as a compared output to the gate circuit V via a resistor 52.

Reference numerals 61 and 62 refer to amplifying transistors. The transistor 61 is turned ON by the output from the comparator IV, to make the transistor 62 conductive. Upon continuity of the transistor 62, the thyristor 13 is turned ON by a gate current from the signal voltage which is applied via bleeder resistors 16 and 17.

Figure 2:
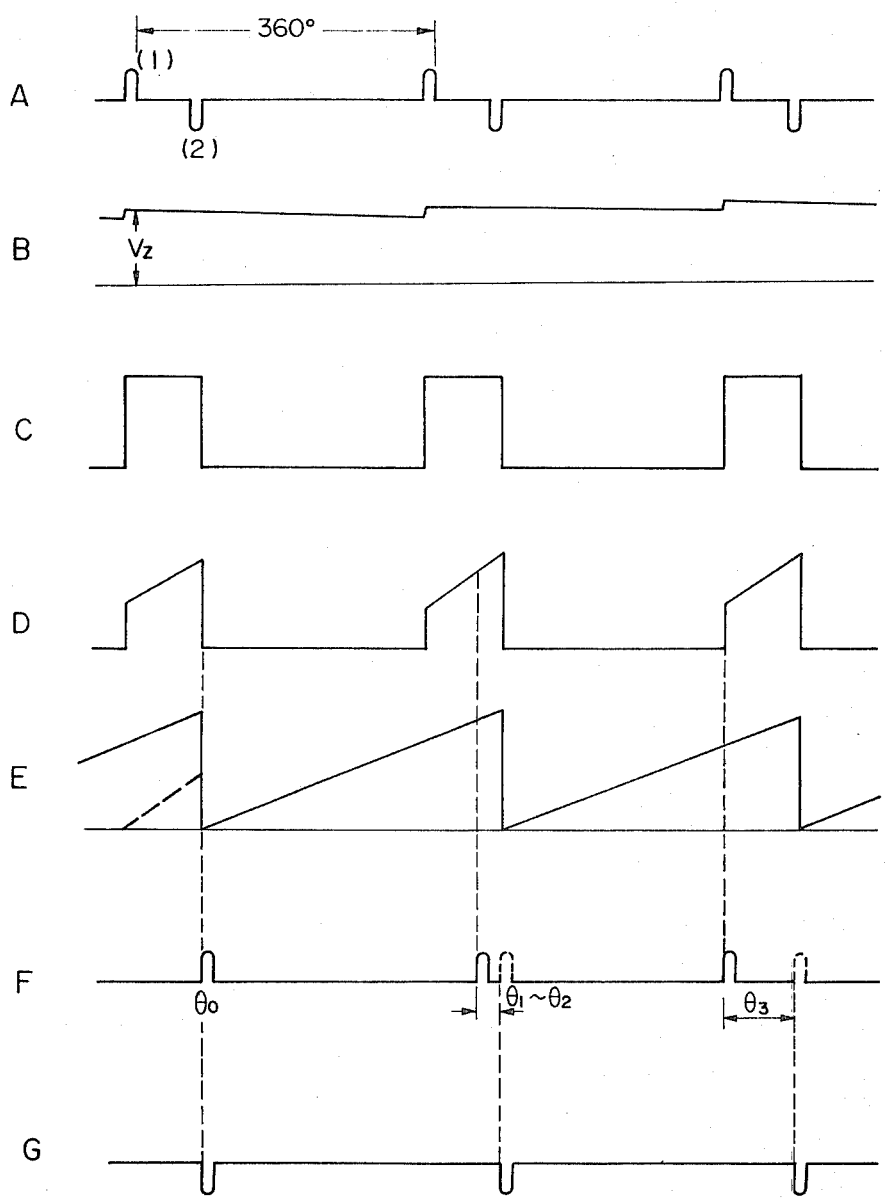
FIG. 2 is a time chart explanatory of the operation of this invention.

A description will be given, with further reference to FIGS. 2, 3 and 4, of the circuit operation of this invention device.

Let it be assumed that the pulser coil 20 produces positive and negative signal voltages first timing pulses and second timing pulses at respective present ignition timings (angles).

Operation before the engine speed reaches a preset range

Figure 4:
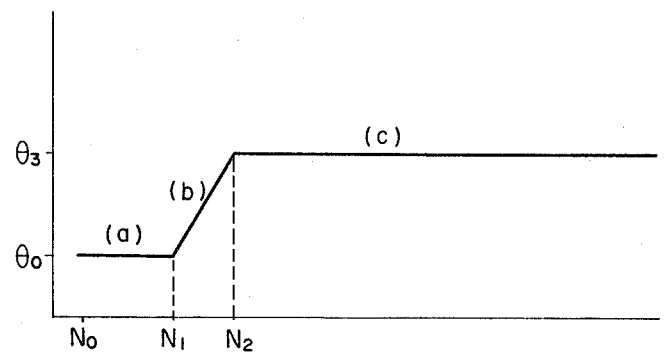
FIG. 4 is a characteristic diagram explanatory of the operation of this invention.

In FIG. 4, the abscissa represents the engine speed N and the ordinate the ignition timing $\theta$. On the abscissa, engine speeds $N_1$ to $N_2$ are within a preset range, those $N_0$ to $N_1$ and higher than $N_2$ are below and above the preset range, respectively. When the generating coil 10 is (+) at its upper side as shown in FIG. 1, the capacitor 12 is charged via the diode 11 in the polarity indicated on the drawing. When the polarity of the coil 10 is reversed from the abovesaid, the diode 11 blocks the charging current to the capacitor 12 to prevent the charging and charges stored therein in the previous half cycle are not discharged, in consequence of which the capacitor 12 remains charged in the polarity shown. On the other hand, when the output voltage of the generating coil 10 has the polarity (−) at the upper side, the signal voltage of the pulser coil 20 is applied via the gate circuit V to the gate of the thyristor 13 to turn it ON, so that in this while, the charges stored in the capacitor 12 are discharged via the thyristor 13 to the ignition coil 14, causing across the ignition plug 15 to produce sparking at a required ignition timing (angle). FIG. 2A shows the signal voltage waveforms and (1) and (2) indicate positive and negative signal voltages first timing pulses and second timing pulses at positions of maximum and minimum advance angles from the top dead center of the engine not shown, respectively. The positive and negative timing pulses are each developed once for each revolution of the engine (a flywheel). When the output voltage of the pulser coil 20 assumes the polarity (+) at its upper side, that is, when the first timing pulse (1) in FIG. 2A occurs, this timing pulse is rectified by the diode 33 and rendered by the constant-voltage element 21 into a constant voltage, thereafter being applied to the circuits II and IV. That is, the capacitor 23 is charged up to the constant voltage via the diode 22 (FIG. 2B). The capacitor 24 is charged by the charged voltage of the capacitor 23 with a charging time constant determined by this capacitor 24 and the resistor 25 (FIG. 2E), so that the saw-tooth wave generator II generates a sawtooth wave (E) operated by continuous integration at a particular rate between adjacent two of the second timing pulses (2) as shown in FIG. 2. The transistor 45 is turned ON by the first timing pulse to charge the capacitor 46 but the terminal voltage of this capacitor 46 is limited to the divided voltage from the voltage divider formed by the resistor 43 and 44, while the capacitor 41 is charged via the diode 42 by the first timing pulse up to a set voltage (FIG. 2C). Accordingly, the charged voltage of the capacitor 41 is higher than that of the capacitor 46 and, as a result of this, the capacitor 46 is further charged with a charge time constant determined by this capacitor 46 and the resistor 47 (FIG. 2D). Then, the output peak voltage of the circuit II, that is, the terminal voltage of the capacitor 24 (at a point (E)), is preset so that this terminal voltage may be higher than the output voltage of the circuit IV, i.e. the terminal voltage of the capacitor 46 (at a point (D)) in the positive period (1) of the signal voltage when the engine speed does not reach the aforementioned preset range (between $N_0$ to $N_1$ in FIG. 4).

A description will be given, with reference to FIG. 3, of the operations of the comparator IV and the gate circuit V. In FIG. 3, reference numerals $N_0$, $N_1$ and $N_2$ indicate engine speeds; $E_0$ to $E_6$ and (D) show on an enlarged scale output voltage sawtooth waveforms of the capacitor 24 and the (knife-shaped) output voltage waveform of the capacitor 46, respectively. With the engine speeds between $N_0$ to $N_1$, the peak values of the sawtooth waves $E_0$ to $E_2$ are all larger than the knife-shaped voltage (D) and the transistor 51 is reversely biased and held in the OFF state. Then, upon occurrence of the negative second timing pulse ((2) in FIG. 2A) in the pulser coil 20, the transistor 26 in the circuit II conducts to discharge the capacitor 24 via a route [resistor 27→ transistor 26 (in its collector-emitter path)], the lowering the terminal potential. Accordingly, when supplied with the negative second timing pulse, the transistor 51 conducts to turn ON the transistors 61 and 62 of the gate circuit V. In consequence, a gate current flows via a route [capacitor 41→transistor 62→thyristor 13], turning ON the thyristor 13. In other words, the arrival of the negative second timing pulse from the pulser coil 20 is accelerated in proportion to the engine speed and, upon each application of the negative second timing pulse, the capacitor 24 is discharged via the transistor 26, so that the peak value of the terminal voltage of the capacitor 24 varies (decreases) as indicated by $E_0$, $E_1$ and $E_2$ in FIG. 3. Accordingly, the circuit II generates a saw-tooth wave synchronized with the second timing pulses. Since the charging time constant of the capacitor 46, which is determined by the transistor 45 and the resistor 47, is set to be extremely short as compared with the charging time constant of the capacitor 24, the inclination angle and the peak value of the output voltage (D) undergo substantially no change between corresponding ones of the first timing pulses and the second timing pulses regardless of the variations in the engine speed. Consequently, when the engine speed increases from $N_0$ to $N_1$, the peak value of the output sawtooth wave from the circuit II undergoes such changes as referred to above but, since the comparator IV sends out it output to the gate of the thyristor 13 upon each arrival of the negative second timing pulse set at a predetermined angle of the pulser coil 20, the capacitor 12 is discharged at a minimum ignition timing of a constant angle to produce sparking, as shown by a characteristic (a) in FIG. 4. FIGS. 2F and 2G show voltage waveforms occuring at points (F) and (G) in FIG. 1, respectively.

Operation when the engine speed stays within or exceeds the preset range

Figure 3:
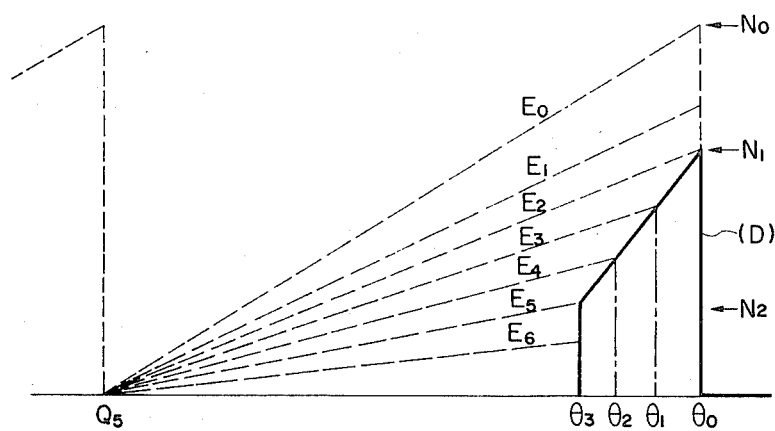
FIG. 3 is a waveform diagram explanatory of the operation of this invention.

When the engine speed further increases to exceed the value $N_1$, the peak value of the terminal voltage from the capacitor 24 decreases as indicated by $E_3$ and $E_4$ in FIG. 3. Accordingly, in the comparator IV the time at which the voltage at the point (E) reaches the voltage at the point (D) advances to hasten the conduction time of the transistor 51. During the aforesaid operation the transistor 51 becomes conductive at the timing (angle) of generation of the negative second timing pulse by the pulser coil 20. However, when the engine speed exceeds the value $N_1$, the transistor 51 becomes conductive before the pulser coil 20 produces the negative second timing pulse, that is, at the positions of angles $\theta_1$ and $\theta_2$ in FIG. 3. Therefore, in the range from $N_1$ to $N_2$ the firing timing of the thyristor 13 advances in proportion to the increase in the engine speed, with the result that the ignition timing also advances as indicated by a characteristic (b) in FIG. 4. When the engine speed further rises to exceed the value $N_2$ and hence get out of the preset range, the capacitor 24 is discharged via the transistor 26 within a shorter time period, the rise of its output voltage via the resistor 25 becomes more and more gentle (as indicated by $E_5$ and $E_6$ in FIG. 3). Then the terminal voltage (at the point (E)) of the capacitor 24 becomes lower than the terminal voltage (at the point (D)) of the capacitor 46. Since the terminal voltage of the capacitor 46 occurs upon each application of the positive first timing pulse from the pulser coil 20, the comparator IV sends out its output at the timing of arrival of the positive first timing voltage, that is, at an angle $\theta_3$ in FIG. 3, so that the thyristor 13 is turned ON at a maximum ignition timing of a fixed angle as indicated by a characteristic (c) in FIG. 4, thus producing sparking.

Operation at the start of the engine

The engine is not always started at the same rotational angular position. In a case where the starting circuit by the elements 30, 29 and 35 are not provided, the charging voltage of the capacitor 24 becomes as indicated by the broken line in FIG. 2E in a first revolution at the start and the capacitor 24 is not sufficiently charged. As a result of this, the transistor 51 for voltage comparison use is turned ON at the maximum ignition timing $\theta_3$ to turn ON the thyristor 13. In the present invention, however, since the capacitors 29 and 24 are connected in series for bypassing the resistor 25, the capacitor 24 quickly rises up during starting alone so that the voltage (E) may be higher than the voltage (D), thus getting over the abovesaid problem. As the capacitor 29, once charged, retains its potential for a long time by its large discharge time constant, it has no affect on the circuit operation after starting. While in the foregoing the capacitor 24 is described to be charged by the terminal voltage of the capacitor 23, it is also possible to employ a battery or the like in place of the capacitor 23. In such a case, the starting circuit by the starting capacitor 29 and so on can be eliminated.

By the above embodiment of this invention, the ignition characteristic of the engine is markedly improved to achieve its high stability and accuracy.

In the abovesaid embodiment of this invention, however, since the pulser coil is used as the driving power source for the controller, the ignition characteristic is unstable in a low engine speed region.

Therefore, another embodiment of the present invention will be described in details below in which a driving power source for the controller is provided independently of the pulser coil, thereby to greatly stabilize the ignition characteristic in the low engine speed region.

Figure 5:
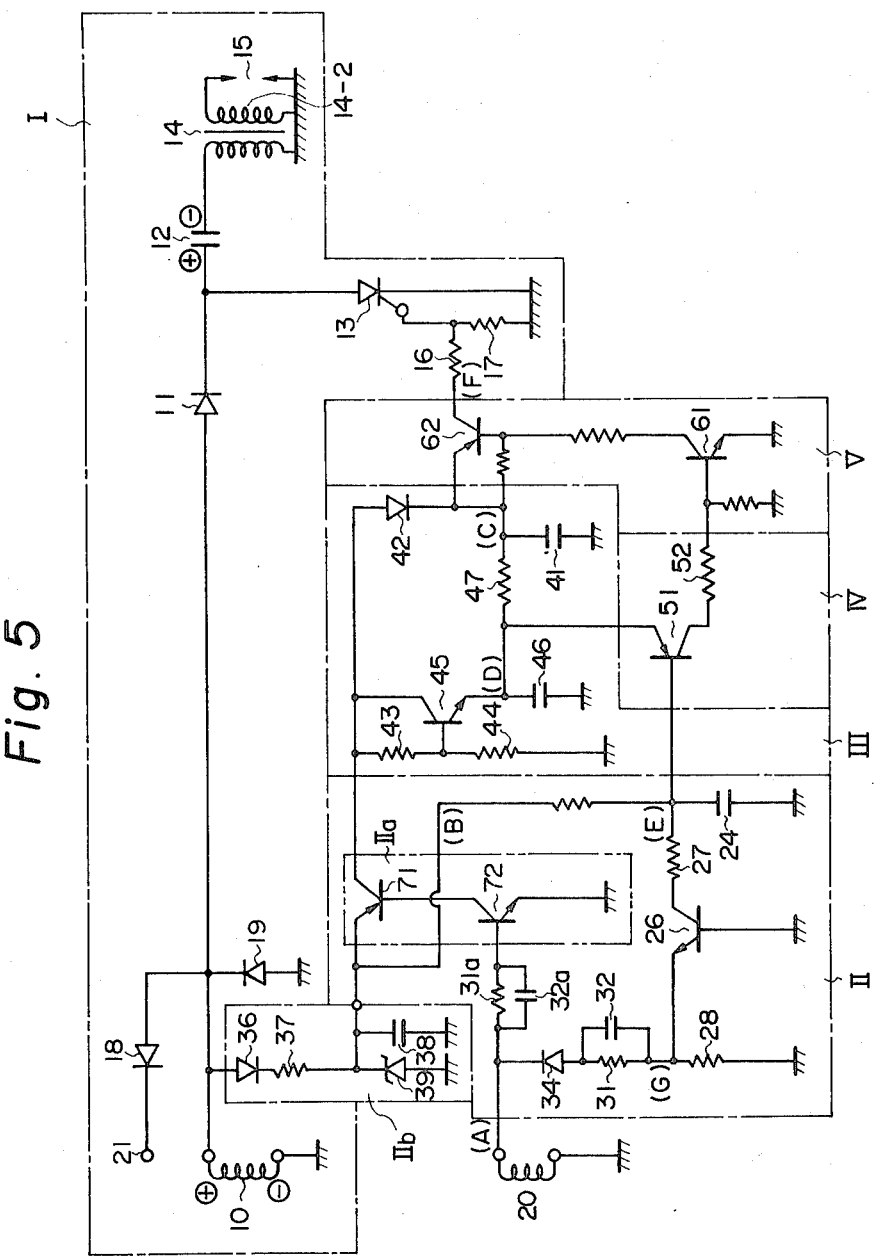

In FIG. 5, reference numeral 10 indicates a generating coil of a magnet type generator or the like which is driven by an engine; 11 designates a rectifying diode; 12 identifies a capacitor serving as an ignition power source, which is charged via the diode 11 by a voltage generated by the generating coil 10; and 13 denotes a thyristor which becomes conductive via a gate circuit described later and by which charges stored in the capacitor 12 are discharged to an ignition coil 14 to produce, via its secondary winding 14-2, sparking at an ignition plug 15. These elements constitute a main circuit I. A diode 18 and a diode 19 are the same as those described with reference to FIG. 1.

Reference numeral 20 represents an ignition signal generating coil (hereinafter referred to as a pulser coil) for producing for each revolution of the engine a first timing pulse and a second timing pulse at respective preset ignition angles.

Reference numerals II, III, IV and V show circuits constituting a control circuit for the main circuit I. II is a sawtooth wave generator for generating in synchronism with the second timing pulses a sawtooth wave voltage the peak value of which varies in proportion to the engine speed; III is an impulse wave generator for generating, for each revolution of the engine, an impulse wave of a knife-shaped waveform which has a substantially constant angle of inclination and a nearly fixed peak value and the front edge and the rear edge of which are respectively synchronized with the corresponding one of the first timing pulses and the corresponding one of the second timing pulses; IV is a comparator for comparing the sawtooth wave (voltage) and the impulse wave (voltage) to produce an output when the peak value of the impulse wave exceeds the peak value of the saw-tooth wave; V is a gate circuit for turning ON the gate of the thyristor 13 by the output from the comparator IV; IIa is a switching circuit which is turned ON and OFF in synchronism with the rotation of the engine; and IIb is a driving power source for the abovesaid control circuit. The driving power source IIb is formed by a diode 36 for rectifying the output voltage of the generating coil 10, a capacitor 38 which is charged by the rectified output from the diode 36 via a resistor 37 and a constant-voltage element 39 for charging the capacitor 38 by a constant voltage. In the sawtooth wave generator 11, reference numeral 24 indicates a capacitor which is charged by the charged voltage of the capacitor 38 with a required time constant which is determined by this capacitor 24 and a resistor 25; 26 designates a transistor connected across the capacitor 24 via resistors 27 and 28, which transistor is turned ON by the second timing pulse from the pulser coil 20 synchronized with the rotation of the engine, constituting a discharge circuit of the capacitor 24; 32, 32a and 31, 31a identify capacitors and resistors for absorbing noise of the signal voltage; and 34 denotes a rectifying diode. The abovesaid elements constitute the circuit II.

Reference numeral 71 represents a switching transistor which is turned ON and OFF via an auxiliary transistor 72 which conducts by the first timing pulse from the pulser coil 20. During the continuity of the transistor 71 the charges of the power source capacitor 38 pass through the transistor 71. Thus the circuit IIa is formed.

Reference numeral 41 shows a capacitor which is charged by the output voltage of the power driving source IIb via a diode 42 when the transistor 71 assumes the ON state; 43 and 44 denote voltage dividing resistors for dividing the driving power source voltage; and 45 represents a transistor the base of which is connected to the voltage dividing point of the voltage dividing resistors 43 and 44 and turned ON by the power source voltage to charge a capacitor 46 up to the divided voltage of the voltage divider so as to from the front edge of the knife-shaped waveform. The capacitors 46 and 41 are connected to each other via a resistor 47. The capacitor 46 is charged by the capacitor 41 to provide a substantially constant inclination angle of the knife-shaped waveform with a time constant which is determined by this capacitor 46 and the resistor 47. These elements constitute the circuit III.

Reference numeral 51 shows a transistor which forms the comparator IV and which has an emitter connected to an impulse wave output (point (D)) of the circuit III, its base connected to a sawtooth wave output (point (E)) of the circuit II and a collector connected as a compared output to the gate circuit V via a resistor 52.

Reference numerals 61 and 62 refer to amplifying transistors. The transistor 61 is turned ON by the output from the comparator IV to make the transistor 62 conductive. Upon continuity of the transistor 62, the thyristor 13 is turned ON by a gate current from the capacitor 41.

A description will be given, with further reference to FIGS. 2, 3 and 4, of the circuit operation of this invention device shown in FIG. 5.

Let it be assumed that the pulser coil 20 produces positive and negative signal voltages first timing pulses and second timing pulses at respective preset ignition timings (angles).

Operation before the engine speed reaches a preset range

In FIG. 4, the abscissa represents the engine speed N and the ordinate the ignition timing $\theta$. On the abscissa, engine speeds $N_1$ to $N_2$ are within a preset range, those $N_0$ to $N_1$ and higher than $N_2$ are below and above the preset range, respectively. When the generating coil 10 is (+) at its upper side as shown in FIG. 5, the capacitor 12 is charged via the diode 11 in the polarity indicated on the drawing. When the polarity of the coil 10 is reversed from the abovesaid ((−) at the upper side), the diode 11 blocks the charging current to the capacitor 12 to prevent the charging and charges stored therein in the previous half cycle are not discharged, in consequence of which the capacitor 12 remains charged in the polarity shown. However, the power source voltage is applied via the gate circuit V to the gate of the thyristor 13 to turn it ON, so that in this while, the charges stored in the capacitor 12 are discharged via the thyristor 13 to the ignition coil 14, causing across the ignition plug 15 to produce sparking at a required ignition timing (angle). FIG. 2A shows the waveform of the output signal from the pulser coil 20 and (1) and (2) indicate positive and negative signals first timing pulses and second timing pulses at positions of maximum and minimum advance angles from the top dead center of the engine not shown, respectively. The positive and negative timing pulses are each developed once for each revolution of the engine (a flywheel). When the output voltage of the generating coil 20 assumes the polarity (+) at its upper side, the capacitor 38 is charged by a constant voltage via the diode 36, the resistor 37 and the constant-voltage diode 39 (FIG. 2B). The capacitor 24 is charged by the charged voltage of the capacitor 38 with a discharge time constant determined by this capacitor 24 and the resistor 25 (FIG. 2E).

When the output voltage of the pulser coil 20 assumes the polarity (+) at its upper side (to produce the positive signal), the transistor 71 is turned ON via the transistor 72. Accordingly, while the transistor 71 is in the ON state, the charges stored in the capacitor 38 are supplied, by which the transistor 45 is turned ON to charge the capacitor 46. However, the terminal voltage of this capacitor 46 is limited to the divided voltage from the voltage divider formed by the resistors 43 and 44, while the capacitor 41 is charged via the diode 42 by the output of the power source IIb up to a set voltage (FIG. 2C). Accordingly, the charge voltage of the capacitor 41 is higher than that of the capacitor 46 and, as a result of this, the capacitor 46 is further charged with a charge time constant determined by the capacitor 46 and the resistor 47 (FIG. 2D). Then, the output peak voltage of the circuit II, that is, the terminal voltage of the capacitor 24 (at a point (E)), is preset so that this terminal voltage may be higher than the output voltage of the circuit IV, i.e. the terminal voltage of the capacitor 46 (at a point (D)) in the positive period (1) of the signal when the engine speed does not reach the aforementioned preset range (between $N_0$ to $N_1$ in FIG. 4).

A description will be given, with reference to FIG. 3, of the operations of the comparator IV and the gate circuit V. In FIG. 3, reference numerals $N_0$, $N_1$ and $N_2$ indicate engine speeds; $E_0$ to $E_6$ and (D) show on an enlarged scale output voltage sawtooth waveforms of the capacitor 24 and the (knife-shaped) output voltage waveform of the capacitor 46, respectively. With the engine speeds between $N_0$ and $N_1$, the peak values of the sawtooth waves $E_0$ and $E_2$ are all larger than the knife-shaped voltage (D) and the transistor 51 is reversely biased and held in the OFF state. Then, upon occurrence of the negative second timing pulse ((2) in FIG. 2A) in the pulser coil 20, the transistor 26 in the circuit II conducts to discharge the capacitor 24 via a route [resistor 27→transistor 26 (in its collector-emitter path)], lowering the terminal potential. Accordingly, when supplied with the negative second timing pulse, the transistor 51 conducts to turn ON the transistors 61 and 62 of the gate circuit V. In consequence, a gate current flows via a route [capacitor 41→transistor 62→the gate of thyristor 13], turning ON the thyristor 13. In other words, the arrival of the negative signal from the pulser coil 20 is accelerated in proportion to the engine speed and, upon each application of the negative signal, the capacitor 24 is discharged via the transistor 26, so that the peak value of the terminal voltage of the capacitor 24 varies (decreases) as indicated by $E_0$, $E_1$ and $E_2$ in FIG. 3. Accordingly, the circuit II generates a saw-tooth wave synchronized with the second timing pulses. Since the charging time constant of the capacitor 46, which is determined by the transistor 45 and the resistor 47, is set to be extremely short as compared with the charging time constant of the capacitor 24, the inclination angle and the peak value of the output voltage (D) undergo substantially no change between corresponding ones of the first timing pulses and the second timing pulses regardless of the variations in the engine speed. Consequently, when the engine speed increases from $N_0$ to $N_1$, the peak value of the output sawtooth wave from the circuit II undergoes such changes as referred to above but, since the comparator IV sends out its output to the gate of the thyristor 13 upon each arrival of the negative second timing pulse set at a predetermined angle of the pulser coil 20, the capacitor 12 is discharged at a minimum ignition timing of a constant angle to produce sparking, as shown by a characteristic (a) in FIG. 4. FIGS. 2F and 2G show voltage waveforms occurring at points (F) and (G) in FIG. 5, respectively.

Operation when the engine speed stays within or exceeds the preset range

When the engine speed further increases to exceed the value $N_1$, the peak value of the terminal voltage from the capacitor 24 decreases as indicated by $E_3$ and $E_4$ in FIG. 3. Accordingly, in the comparator IV the time at which the voltage at the point (E) reaches the voltage at the point (D) advances to hasten the conduction time of the transistor 51. During the aforesaid operation the transistor 51 becomes conductive at the time (angle) of generation of the negative second timing pulse by the pulser coil 20. However, when the engine speed exceeds the value $N_1$, the transistor 51 becomes conductive before the pulse coil 20 produces the negative second timing pulse, that is, at the positions of angle $\theta_1$ and $\theta_2$ in FIG. 3. Therefore, in the range from $N_1$ to $N_2$ the firing timing of the thyristor 13 advances in proportion to the increase in the engine speed, with the result that the ignition timing also advances as indicated by a characteristic (b) in FIG. 4. When the engine speed further rises to exceed the value $N_2$ and hence get out of the preset range, the capacitor 24 is discharged via the transistor 26 within a shorter time period, the rise of its output voltage via the resistor 25 becomes more and more gentle (as indicated by $E_5$ and $E_6$ in FIG. 3). Then the terminal voltage (at the point (E)) of the capacitor 24 becomes lower than the terminal voltage (at the point (D)) of the capacitor 46. Since the terminal voltage of the capacitor 46 occurs upon each application of the positive first timing pulse from the pulser coil 20, the comparator IV sends out its output at the timing of arrival of the positive first timing pulse, that is, at an angle $\theta_3$ in FIG. 3, so that the thyristor 13 is turned ON at a maximum ignition timing of a fixed angle as indicated by a characteristic (c) in FIG. 4, thus producing sparking.

The above operations are described on the assumption that a sufficient driving power is applied to the control circuit but, in this regard, the aforementioned former embodiment of the invention poses some problem. In the former embodiment, since the first timing pulses and the second timing pulses of the pulser coil 20 is used as the driving power source for the control circuit, the output voltage from the pulser coil is extremely low at the start of the engine or during its low-speed running and, coupled with a voltage drop across the rectifying diode, it leads to insufficient charging of the capacitor 24 or 41, resulting in a trigger voltage of the thyristor 13 tending to become somewhat high. In the later embodiment of the present invention, however, the small pulses of the pulser coil 20 is used for only turning ON and OFF the transistor 26 and 71 and the controller is driven by the output from the generating coil 10 which generates a relatively high voltage even during the low-speed driving of the engine. Coupled with the number of diodes (one) inserted in the charging circuit, the later embodiment ensures sufficient charging of the capacitors 41 and 24 up to predetermined values to greatly decrease the trigger voltage of the thyristor, achieving very stably ignition characteristic in the low-speed region.

Although in the foregoing the power source is derived from the generating coil 10, it may also be obtained from another auxiliary coil of the generator or a battery. Since the output voltage of the pulser coil 20 is a pulse train synchronized with the revolution of the generator, the pulse train can be produced through a senser, such as a magneto-resistor.

As will be appreciated from the foregoing description, the present invention provides, with a simple circuit arrangement and at low cost, the advance-angle characteristic which conforms to the output characteristic of the engine; accordingly, the invention is of great practical utility.

What we claim is:

1. A capacitor charge and discharge type ignition device comprising:
   a main circuit (I) to charge a capacitor (12) by the voltage of a generating coil (10) and to discharge the stored charges of the capacitor (12) via a thyristor (13) to an ignition coil (14);
   an impulse generator (20) for generating first timing pulses ((1) of A) and second timing pulses ((2) of A) respectively synchronized with a predetermined maximum ignition angle ($\theta_3$) and a predetermined minimum ignition angle ($\theta_0$);
   a sawtooth wave generator (II) for generating a sawtooth wave (E) operated by continuous integration at a particular rate between adjacent two of said second timing pulses to as to have a peak value which varies with the revolution of an engine;
   an impulse wave generator (III) for generating for each revolution of the engine an impulse wave of a knife-shaped waveform (D) the front edge and the rear edge of which are respectively synchronized with the corresponding one of the first timing pulses and the corresponding one of the second timing pulses, said knife-shaped waveform having a substantially constant inclination angle and a substantially constant peak value;
   a comparator (IV) for comparing the sawtooth wave and the impulse wave to provide an output when the peak value of the impulse wave (D) exceeds the peak value of the sawtooth wave (E);
   a gate circuit (V) for turning ON the gate of the thyristor (13) by the output of the comparator; and
   a power source (20) provided to supply source power to said gate circuit (V), said saw-tooth wave generator (II), said impulse wave generator (III) and said comparator (IV);
   wherein when the engine speed is within a preset range, an advance-angle ignition characteristic corresponding to the engine speed is obtained while minimum and maximum advance-angle ignition characteristics are obtained when the engine speed is below and above the preset range, respectively.

2. A capacitor charge and discharge type ignition device according to claim 1, wherein an ignition signal of an ignition signal generating coil is used as said power source to drive the sawtooth wave generator and the impulse wave generator.

3. A capacitor charge and discharge type ignition device according to claim 2, in which the impulse generator comprises means for the voltage of the first timing pulses ((1) of A) to be limited to a predetermined value.

4. A capacitor charge and discharge type ignition device according to claim 2, wherein the sawtooth wave generator (II) includes a first capacitor (23) charged via a first diode (22) by the first timing pulses, a second capacitor (24) charged via a first register (25) by the charged voltage of the first capacitor (23) in response to the second timing pulses, and a first transistor (26) forming a discharge circuit of the second capacitor (24) synchronized with the engine speed.

5. A capacitor charge and discharge type ignition device according to claim 4, wherein a third capacitor (29) charged via a second diode (30) by the first timing pulses is connected in series to the second capacitor (24).

6. A capacitor charge and discharge type ignition device according to claim 2, wherein the impulse wave generator (III) includes a fourth capacitor (41) charged via a third diode (42) by the first timing pulses, a voltage divider (43,44) for dividing the voltage of the first timing pulses, a first circuit for charging a fifth capacitor (46) up to a divided voltage of the voltage divider (43,44) via a second transistor (45) conducted by the first timing pulses, and a second circuit for charging the fifth capacitor (46) by the charged voltage of the fourth capacitor (41) via a second resistor (47).

7. A capacitor charge and discharge type ignition device comprising:
   a main circuit (I) to change a capacitor (12) by the voltage of a generating coil (10) and to discharge the stored charges of the capacitor (12) via a thyristor (13) to an ignition coil (14) of an engine for producing sparking in the ignition plug (15);
   an impulse generator (20) for generating first timing pulses ((1) of A) and second timing pulses ((2 of A) respectively synchronized with a predetermined maximum ignition angle ($\theta_3$) and a predetermined minimum ignition angle ($\theta_0$);
   a sawtooth wave generator (II) for generating a sawtooth wave (E) operated by continuous integration at a particular rate between adjacent two of said second timing pulses so as to have a peak value which varies with the revolution of the engine;
   an impulse wave generator (III) for generating for each revolution of the engine an impulse wave of a knife-shaped waveform (D) the front edge and the rear edge of which are respectively synchronized with the corresponding one of the first timing pulses and the corresponding one of the second timing pulses, said knife-shaped waveform having a substantially constant inclination angle and a substantially constant peak value;
   a comparator (IV) for comparing the sawtooth wave and the impulse wave to provide an output when the peak value of the impulse wave (D) exceeds the peak value of the sawtooth wave (E);
   a gate circuit (V) for turning ON the gate of the thyristor (13) by the output of the comparator;
   a power source (IIb) provided to supply source power to said gate circuit (V), said saw-tooth wave generator (II), said impulses wave generator (III) and said comparator (IV); and
   a switching circuit (IIa), which is turned ON and OFF, respectively, in synchronism with the first timing pulses and the second timing pulses, the input of which is connected to the power source (IIB), and the output of which is connected to the impulse wave generator (III), the comparator (IV) and the gate circuit (V).

8. A capacitor charge-and-discharge type ignition device for an internal combustion engine comprising: a main circuit a voltage generating coil, an ignition coil, a capacitor charged by the voltage generating coil, means comprising a thyristor to discharge stored charges of said capacitor and apply them to said ignition coil; an impulse generator for generating first timing pulses and second timing pulses respectively synchronized with a predetermined maximum ignition angle and a predetermined minimum ignition angle; a sawtooth wave generator for generating a sawtooth wave operated by continuous integration at a particular rate between adjacent two of said second timing pulses so as to have peak values variable in proportion to engine speed; an impulse wave generator for generating for each revolution of the engine an impulse of a knife-shaped voltage the leading edge and the trailing edge of which are synchronized with the corresponding one of the first timing pulses and the corresponding one of second timing pulses respectively, said knifed-shaped voltage having a substantially constant inclination angle and a substantially constant peak value; a comparator for comparing the sawtooth voltage wave and the knife-shaped voltage to develop an output when the peak value of the knife-shaped voltage exceeds the peak of the sawtooth voltage wave;
   a gate circuit for turning ON the thyristor in response to the output of the comparator; and a power source to supply source power to said gate circuit, said sawtooth wave generator, said impulse wave generator and said comparator; thereby when the engine speed is within a preset range, an advance-angle characteristic corresponding to the engine speed is obtained while minimum and maximum advance-angle ignition characteristics are obtained when the engine speed is below and above the preset speed range, respectively.

9. A capacitor charge-and-discharge type ignition device for an internal combustion engine according to claim 8, in which the impulse generator comprises means for limiting the voltage value of said first timing pulse to a predetermined value.

10. A capacitor charge-and-discharge type ignition device for an internal combustion engine according to claim 8, in which said sawtooth wave generator comprises a first capacitor, a first diode connected to the first capacitor applying the first timing pulses to said first capacitor for charging the first capacitor, a second capacitor, a first register applying charge voltages of the first capacitor to the second capacitor in response to the second timing pulses, and a first transistor defining a discharge circuit of the second capacitor synchronized with the engine speed.

11. A capacitor charge-and-discharge type ignition device for an internal combustion engine according to claim 10, including a third capacitor, a second diode through which the first timing pulses are applied to the third capacitor in series connection to the second capacitor.

12. A capacitor charge-and-discharge type ignition device for an internal combustion engine having an ignition plug, comprising: a main circuit having a capacitor, a voltage generating coil for charging the capacitor, an ignition coil for producing sparking in the ignition plug, and a thyristor for discharging the capacitor to the ignition coil;
   an impulse generator for generating first timing pulses and second timing pulses respectively synchronized with a predetermined maximum ignition angle and a predetermined minimum ignition angle;
   a sawtooth wave generator for generating a sawtooth wave operated by continuous integration at a particular rate between adjacent two of said second timing pulses so as to have a peak value which varies with revolution speed of the engine;
   an impulse wave generator for generating for each revolution of the engine an impulse of a knife-shaped waveform the leading edge and the trailing edge of which are respectively synchronized a corresponding one of the first timing pulses and a corresponding one of the second timing pulses, said knife-shaped waveform having a substantially constant inclination angle and a substantially constant peak value;
   a comparator for comparing the sawtooth wave and the knife-shaped waveform and developing an output when the peak value of the knife-shaped waveform exceeds the peak value of the sawtooth wave;

a gate circuit effective for rendering the thyristor conductive in response to the output of the comparator;
a power source connected to supply source power to said gate circuit, said sawtooth wave generator said impulses wave generator and said comparator; and
a switching circuit turned ON and OFF in synchronism with the revolutions of the engine and ON and OFF respectively in synchronism with the first timing pulses and the second timing pulses, the switching circuit having an input connected to said power source and an output connected to the impulse wave generator, the comparator and the gate circuit.

* * * * *